Dec. 29, 1942.     P. L. MYER ET AL     2,306,745
TELEGRAPH SYSTEM AND APPARATUS THEREFOR
Filed July 26, 1940     2 Sheets-Sheet 1
FIG. 1
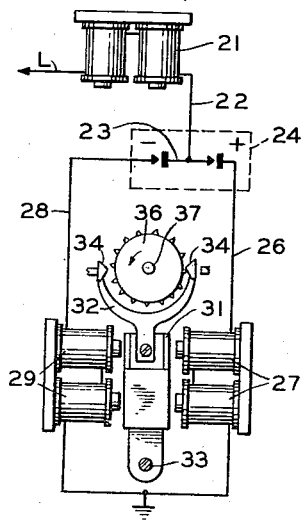
FIG. 2
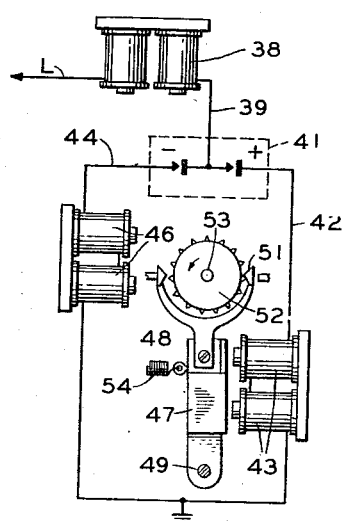
FIG. 3
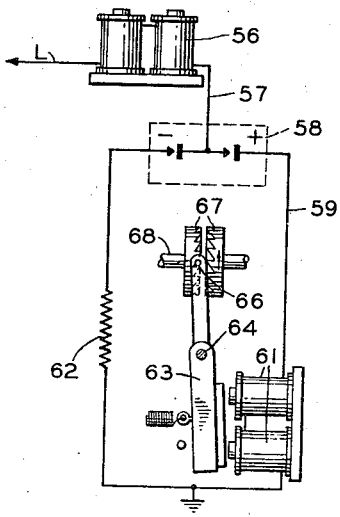
FIG. 4
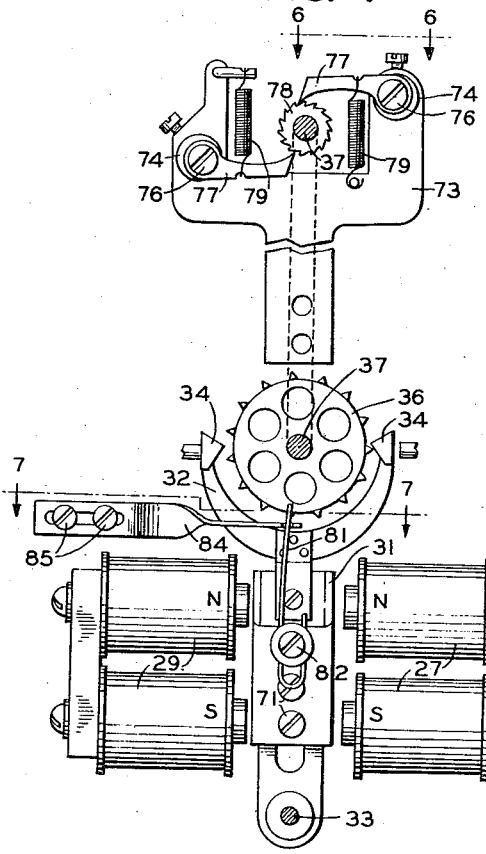
FIG. 5
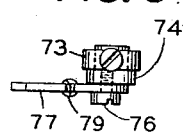
FIG. 6
FIG. 7
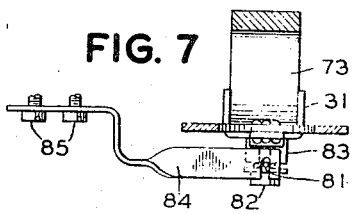
INVENTORS
P. L. MYER
C. G. GALL
M. U. DAVIS
BY
M. R. Marsh
ATTORNEY Dec. 29, 1942.   P. L. MYER ET AL   2,306,745
TELEGRAPH SYSTEM AND APPARATUS THEREFOR
Filed July 26, 1940   2 Sheets-Sheet 2
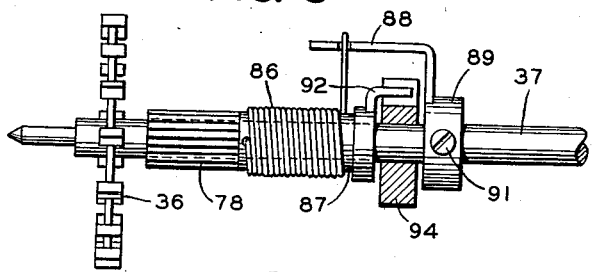
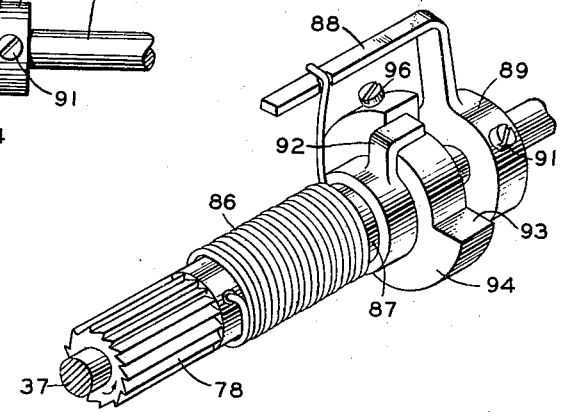
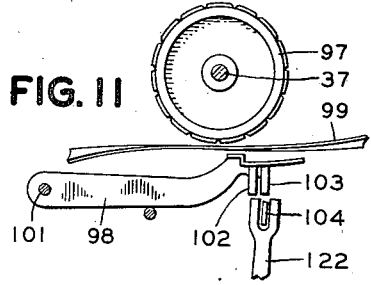
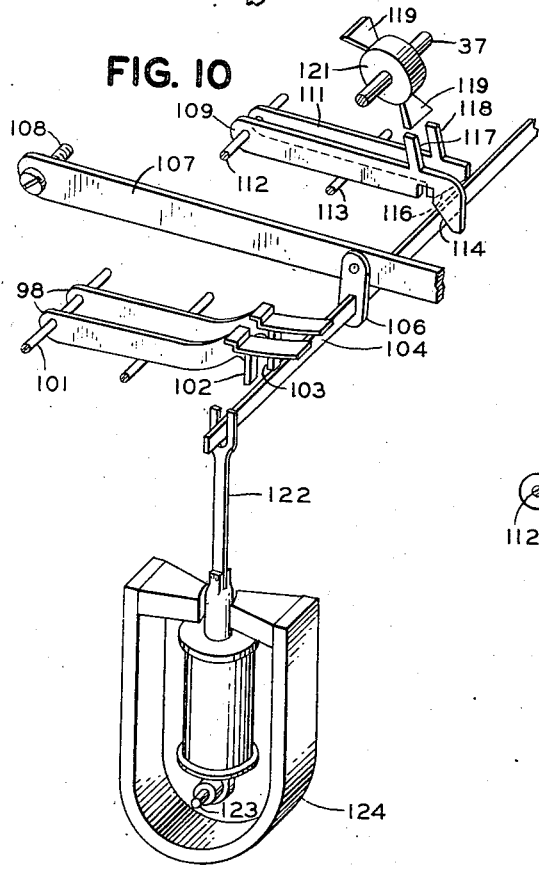
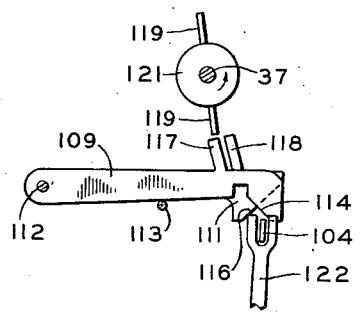
INVENTORS
P. L. MYER
C. C. GALL
M. U. DAVIS
BY M. R. Marsh
ATTORNEY Patented Dec. 29, 1942

2,306,745

UNITED STATES PATENT OFFICE 2,306,745

TELEGRAPH SYSTEM AND APPARATUS THEREFOR

Percy L. Myer, Ozone Park, and Charles C. Gall, Richmond Hill, N. Y., and Max U. Davis, Lakewood, Ohio, assignors to The Western Union Telegraph Company, New York, N. Y., a corporation of New York Application July 26, 1940, Serial No. 347,644

6 Claims. (Cl. 178—40)

This invention relates in general to a telegraph system and apparatus therefor and more particularly to a system and apparatus for operating step-by-step receivers, such as tickers, in a novel arrangement.

One well-known type of step-by-step receiver is what is known in the art as a self-winding ticker. The self-winding ticker operates under the control of signals received over two line wires or circuits, one circuit being generally known as the type circuit and the other being known as the shift circuit. The impulses transmitted over these circuits are polar impulses. At each ticker the type circuit has a press magnet and an escapement magnet in series therewith. The press magnet is a comparatively slow operating neutral magnet which actuates the press mechanism to record the selected character from the typewheel, while the escapement magnet is a quick operating magnet which controls the rotation of the typewheel. The press magnet being slow operating does not respond to the short escapement impulses transmitted over the type circuit, but it is actuated by the prolonged press impulses. The shift circuit controls the operation of both shift and winding magnets in the ticker. The shift magnet being polarized, moves its armature to the letters or figures side depending on the polarity of the current transmitted, while the neutral winding magnet responds to make-break impulses of either polarity.

Another type of step-by-step ticker is one that is known in the art as the universal ticker. It is controlled by make and break signals transmitted over two separate circuits. The first circuit, known as the type circuit, controls the rotation of the typewheel, and the second, known as the press circuit, controls the operation of the press or printing mechanism. The operation of the universal ticker is such that after the correct number of impulses has been transmitted over the type circuit to step the typewheel to the correct position and place the desired character over the print hammer, an impulse is transmitted over the press circuit to record the desired character on the recording paper, the transmission of impulses over the type circuit ceasing momentarily during transmission of an impulse over the press circuit.

Obviously, where tickers of the above type are employed, each ticker circuit requires two separate line wires for operation and with such arrangements comparatively large charges have to be made for the line circuits. Accordingly, it is one of the primary objects of the present invention to operate directly telegraph receivers such as tickers of the step-by-step type under the control of signals received over a single line circuit.

In connection with the above object, it is a still further object of the invention to provide means for operating step-by-step receivers under the control of signals received over one line circuit at a speed comparable with the speed at which they can be operated over two line circuits.

Still another object of the invention is to provide means for converting step-by-step receivers of the well known type normally controlled by signals received over two line circuits for control by signals received over one line circuit, and although certain of the apparatus for accomplishing the above objects, such as the magnets for controlling the escapement, in the preferred embodiment of the invention are designed and arranged primarily for this particular purpose, it will be obvious that their application is not limited to this particular arrangement but may be applied to various other apparatus.

These and other objects of the invention will be more apparent in the following description when taken in conjunction with the accompanying drawings, in the latter of which:

Fig. 1 is a wiring diagram showing the preferred manner in which some of the elements of a self-winding ticker are employed and connected along with added elements to effect the operation thereof under the control of signals received over a single line wire;

Fig. 2 is a modified arrangement for controlling a self-winding ticker by signals received over one line circuit;

Fig. 3 is a wiring diagram of the elements employed in a universal ticker along with added elements to control the operation thereof by signals transmitted over a single circuit;

Fig. 4 is an exploded elevational view showing the typewheel shaft drive and typewheel shaft escapement arrangement employed in the preferred embodiment of the self-winding ticker arrangement;

Fig. 5 is a side elevational view of the apparatus shown in Fig. 4;

Fig. 6 is a horizontal sectional view taken on line 6—6 of Fig. 4;

Fig. 7 is a horizontal sectional view taken on line 7—7 of Fig. 4;

Fig. 8 is a view showing the typewheel shaft escapement wheel and the driving and winding spring for the type wheel shaft;

Fig. 9 is a perspective view of a part of the elements of Fig. 8;

Fig. 10 is a perspective view of the shift elements and the controls thereof;

Fig. 11 is an elevational view of the printing hammers or platens and shift fork together with the typewheel; and Fig. 12 is an elevational view of the shift control mechanism.

Referring first to Fig. 1, the line circuit L is connected through a pair of press magnets 21 and then over a conductor 22 to the center terminal 23 of a rectifier which in the preferred embodiment is of the copper oxide type and is indicated diagrammatically as being within the dot-dashed rectangle 24. The rectifier 24 is connected so that positive and negative potentials received over conductor 22 and applied to the center tap permit the negative impulses to flow or pass to the left and the positive impulses to pass to the right. The positive or right hand terminal of the rectifier 24 is connected by a conductor 26 through the right hand pair of escapement control magnets 27 to ground, while the left hand terminal of the rectifier is connected by a conductor 28 through the left hand pair of escapement control magnets 29 to ground. The magnet sets 27 and 29 are disposed opposite one another with a common armature 31 interposed between the two sets of magnets. The armature 31 is carried on an escapement yoke 32 pivotally mounted at 33 adjacent the lower end thereof and carrying on the upper ends thereof escapement anvils 34. The escapement anvils 34 cooperate with an escapement wheel 36 fixed to a typewheel shaft 37 to permit the latter to be selectively rotated in a manner hereinafter set forth in more detail.

In accordance with the invention, the impulses transmitted over the line L, Fig. 1, comprise alternate impulses of opposite polarity or escapement impulses, with the escapement impulses being interspersed by elongated press impulses of the polarity of the last escapement impulse. The individual escapement impulses being of comparatively short duration are ineffective on the press magnets 21 and therefore the associated press mechanism is inoperative during the receipt of the short individual escapement impulses. As the polar signals are applied to the center tap 23 of the rectifier 24, the positive ones pass to the right and through the magnets 27 to ground, while the negative impulses pass to the left and through the magnets 29 to ground. Obviously during the passage of one polar impulse through one set of magnets, either 27 or 29, there is very little current flowing in the other set of escapement magnets. The energization of first one set of escapement magnets, such as 27, and then the other set, such as 29, oscillates the escapement yoke 32 and permits the typewheel shaft 37 to rotate or step a predetermined distance for each movement of the yoke 32. After the yoke 32 has oscillated a sufficient number of times to bring the desired character on the typewheel into printing position, the last escapement impulse is elongated or continued to effect energization of the press magnets 21 to record the character on the recording paper. Thus, the press and escapement mechanisms operate in response to polar signals received over a single line circuit. The arrangement whereby the usual winding and shift magnets of a standard self-winding ticker and the associated circuit is dispensed with and the said shift and winding functions performed in conjunction with the signals transmitted over the single circuit, will be pointed out in following paragraphs.

In the modification shown in Fig. 2 the polar impulses received over the line L pass through a press magnet 38 and then over a conductor 39 to the center terminal of a rectifier 41. The right hand or positive terminal of the rectifier is connected by a conductor 42 through the coils of a pair of neutral escapement magnets 43 to ground. The left hand or negative terminal of the rectifier 41 is connected by a conductor 44 through the coils of a neutral set of magnets 46, hereinafter referred to as a winding magnet, to ground. The escapement magnets 43 have in operative relation therewith an armature 47 which is supported on an escapement yoke 48, the latter being pivoted at its lower end at 49 and having at its upper end escapement anvils 51 disposed on opposite sides of an escapement wheel 52. Escapement wheel 52 is fixed for rotation therewith to a typewheel shaft 53 to control the rotation thereof in a well-known manner. A spring 54 attached to the escapement yoke 48 normally tends to pivot the same in a counter-clockwise direction against the action of the neutral escapement control magnet 43.

As in the modification shown in Fig. 1, the polar impulses on being applied to the center terminal of the rectifier 41, Fig. 2, permit the passage of the positive impulses through the right hand terminal thereof, and the negative impulses through the left hand terminal. Alternate positive and negative impulses are transmitted over the line L, and therefore the magnets 43 and 46 are alternately energized. The energization of the escapement control magnets 43 moves the escapement yoke 48 to the right against the action of its attached retractile spring 54 to allow the escapement wheel 52 to rotate or step a predetermined amount. During the receipt of a negative impulse, the winding magnet 46 is energized and the escapement magnets 43 will be deenergized allowing the spring 54 on the escapement yoke to move the latter to the left and permit another step of the escapement wheel 52. The energization of the winding magnet through an arrangement of standard elements on the self-winding ticker winds a spring tending to rotate the typewheel shaft 53. After the transmission of the correct number of polar impulses to step the typewheel to the desired position, the last impulse is prolonged to effect operation of the press magnet 38, which through standard self-winding elements records the selected character on the recording tape. The escapement control magnet 43 and the winding magnet 46 are preferably of the same resistance with similar inductive characteristics so that the resistance and impedance at the ticker circuit remains substantially the same for either polarity of impulses.

The arrangement for operating a universal type of ticker under the control of signals transmitted over a single line is shown in Fig. 3. In the arrangement shown in Fig. 3 the line circuit L passes through a press magnet 56 and thence over the conductor 57 to the center terminal of a rectifier 58. The right hand or positive terminal of the rectifier 58 is connected by a conductor 59 through the coils of an escapement control magnet 61 to ground, while the left hand or negative terminal of the rectifier is connected through a resistance 62 which preferably has some impedance to ground. The escapement control magnet 61 operates a spring biased escapement lever 63 in accordance with the energization and deenergization thereof. The escapement lever 63 is pivoted at 64 adjacent the center thereof and carries at the upper end a pin 66 adapted to cooperate with the faces of oppositely disposed crown wheels 67. The crown wheels 67 are fixed to the typewheel shaft 68 and the pin 66 oscillating under control of the magnet 61 cooperates with the beveled teeth of the crown wheel 67 to step the typewheel shaft 68 a predetermined distance for each oscillation of the armature lever 63. Following the transmission of the desired number of escapement impulses to operate the fast operating escapement control magnet 61 the correct number of times, a prolonged press impulse is transmitted to operate the slower operating press magnet 56. The slow operating press magnet 56 operates on either polarity and accordingly is effective to operate the associated press mechanism on an elongated impulse of positive or negative polarity. The impedance 62 is preferably equal to the impedance of the coils of the escapement control magnet 61 and also in the preferred embodiment has the same inductive characteristics as the magnet 61, and therefore the resistance and inductive characteristics of the ticker remain constant for either polarity of signals.

It will be noted from the above description of the elements in Fig. 3 that no change in the operating mechanism or arrangements thereof is required to convert a universal type ticker from two wire to one wire control, the change residing in the manner of wiring the magnets and possibly the windings thereof and the addition of a rectifier 34 and impedance 62 connected as described. Thus, the fundamental principles of operating the universal ticker remain the same. The changes in a self-winding ticker necessary to adapt the same to operate as shown in Fig. 2 necessitate the rewiring of the connections to the press and winding magnets and the addition of a rectifier 41. The standard escapement control magnet is replaced by a neutral escapement control magnet 43 and a spring is employed to oscillate the escapement yoke 48 in one direction.

In Fig. 1, the preferred embodiment of the invention, the standard winding, shift and escapement magnets are removed and the two sets of neutral escapement control magnets 27 and 29 together with the rectifier 24 added. The added magnet sets 27 and 29, the rectifier 24 and the standard press magnet 21 are connected as shown. As shown in Figs. 1 and 2, the standard press magnet is employed, and to effect printing from either one or the other of the two rows of type elements on the typewheels, a mechanical shift arrangement is provided. The mechanical shift arrangement effects a shift operation on the receipt of a press impulse with the typewheel stopped in a predetermined position and will be hereinafter described in detail along with the arrangement employed in the preferred embodiment to wind the typewheel driving spring.

Figs. 4, 5 and 7 show some of the elements, such as the escapement yoke 32, the armature 31, the typewheel shaft 37, the escapement wheel 36, the escapement anvils 34 and the escapement control magnets 27 and 29, which are indicated generally in Fig. 1, and in the description of the elements of Figs. 4, 5 and 7 the similar reference numerals refer to similar elements of Fig. 1.

As hereinbefore stated the standard winding magnet is dispensed with in the preferred embodiment of the invention, the winding of a spring for driving the typewheel shaft is effected simultaneously with the escapement of the typewheel shaft. The armature 31 associated with the escapement control magnets 27 and 29 is attached to the lower section of the escapement yoke 32 by screws, such as 71, extending through elongated slots 72 in the yoke and threaded into the lower end of a driving yoke 73. The upper end of the driving yoke 73 is bifurcated with the arms thereof extending on either side of the typewheel shaft 37. Adjacent the ends of the arms of the driving yoke 73 are bushings 74, and eccentrically mounted in the bushings 74 by shoulder screws 76 are two pawls 77. The right hand pawl, as shown in Fig. 4, extends above the typewheel shaft 37 and cooperates with the teeth on the upper side of a ratchet 78 loosely mounted on the typewheel shaft 37, while the left hand pawl cooperates with the teeth on the under side of the ratchet. The pawls are held in engagement with the ratchet 78 by individual springs, such as 79, the pawls being mounted eccentrically in the bushings 74 in order to effect adjustment thereof relative to the ratchet 78 for reasons which will be apparent.

As stated hereinbefore, the escapement control magnets 27 and 29 are alternately energized to oscillate the escapement yoke 72, and in the preferred embodiment of the invention the windings of the individual escapement control magnets and connections thereof are such, as shown in Fig. 4, that on the passage of current therethrough the pole pieces of each set establish opposite poles and the polarity of oppositely disposed pole pieces are the same. That is, if the two upper coils of both sets are wound so that the exposed poles are negatives, the exposed poles of the lower coils in both sets are positive. With the escapement control magnets 27 and 29 connected in this manner it will be obvious that following the energization of one set and the magnetization of the armature 31 there is no reversal of magnetism in the armature when the other set is energized. Thus, moving the armature yoke 32 from one of its extreme positions to the other requires no reversal of the magnetism in the armature 31, and the yoke is therefore capable of being oscillated at a relatively high rate of speed with relatively small currents in the magnets 27 and 29. The above described arrangement of the magnets 27 and 29 constitutes one of the novel features of the invention and enables the escapement yoke to function at a high rate of speed and provide ample power for effecting the winding operation as will hereinafter be described.

In a rectifier, such as the copper oxide rectifier 24, Fig. 1, there is a slight amount of leakage allowing a small amount of positive current to flow through the negative left hand terminal when positive potential is applied at the center tap 23. Likewise there is a slight leakage through the right hand terminal of negative potential and these leakages are employed to assist in the movement of the escapement yoke 32. Thus, if positive potential is applied to the center terminal 23 of the rectifier 24, the major portion thereof passes through the escapement magnets 27 to move the escapement yoke 32 toward the right, while the small fraction of the impulse leaking through the left hand part of the rectifier is effective on the escapement magnet 29 to accelerate the movement of the armature yoke 32 toward the right. In the same manner the leakage of a small fraction of a negative impulse through the escapement magnets 27 assists in moving the armature yoke to the left when the escapement magnets 29 are energized by the major portion of the negative impulse.

Another arrangement assisting in the speed of operation of the armature yoke 32 consists of a relatively stiff single wire spring 81, Figs. 4, 5 and 7, clamped by a screw 82 to a bushing or spacer 83 on the yoke 32. The wire 81 cooperates with a fork on the free end of an adjustable arm 84, the arm 84 being adjusted by means of screws 85 extending through slots in the left hand end thereof, as shown in Figs. 4 and 7. The fork in the free end of the arm 84 cooperates with the single wire spring 81 to hold the escapement yoke 32 in the center of its oscillating path when both sets of escapement control magnets 27 and 29 are deenergized. As the escapement yoke moves from its central position toward one set of magnets such as 27, the spring 81 is bent or flexed, and when this set of magnets such as 27 is deenergized and the opposite set 29 energized, the spring 81 accelerates the movement of the armature yoke. During the first part of an oscillation of the escapement yoke 32 the force of the spring 81 is strongest and the magnetic pull on the armature is weakest due to the air gap between the pole pieces and the armature 31, while during the latter half of such a movement or during the period in which the magnetic attraction is increasing due to the decreasing air gap, energy is restored in the spring 81 to accelerate movement thereof in a reverse direction on the energization of the opposite set of magnets. This feature, coupled with the above described features, gives an extremely fast, reliable and positive operation of the escapement yoke 32, with ample power for escaping the escapement wheel 36 and effecting a typewheel winding operation, as hereinafter set forth.

The typewheel shaft 37 normally tends to rotate and the rotating force is supplied by a spring 86, Figs. 8 and 9. The spring 86 is coiled about a sleeve member 87 loosely mounted on the typewheel shaft 37 and is formed integral with the hereinbefore mentioned ratchet 78. One end of the spring 86 is anchored on the sleeve 87, while the other end of the spring 86 cooperates with an arm 88 extending from a collar 89 fixed to the typewheel shaft 37 by a set screw 91. The winding of the spring 86 is effected by the pawls 77, Fig. 4, oscillating with the escapement yoke 32. On movement of the escapement yoke to the right the left hand pawl 77 engages the ratchet 78 to rotate the same, while on a movement of the escapement yoke to the left the upper pawl rotates the ratchet. The number of teeth on the ratchet 78 is equal to the number of teeth on the escapement wheel 36, and hence the tension in the spring remains substantially constant during the receipt of a series of escapement impulses, in which the escapement wheel 36 is escaped one tooth concomitantly with stepping of the ratchet 78 one tooth. By loosening the set screw 91, the collar 89 and one end of the spring 86 may be rotated relative to the other end of the spring and ratchet 78, and thus the initial tension in the spring 86 may be easily varied.

The sleeve 87, Figs. 8 and 9, has extending from adjacent the right hand end thereof an arm 92 which extends into a notch 93 formed in the collar 94 fixed to the typewheel shaft 37 by a set screw 96. In the transmission of signals to a self-winding ticker, escapement impulses are transmitted when there are no press impulses, and these escapement impulses are effective to normally escape the typewheel shaft. However, after the receipt of a predetermined number of continuous escapement impulses, a number required to escape the typewheel shaft for two revolutions, the unison device is effective to stop further rotation of the typewheel shaft although more escapement impulses continue to be received. The unison device is an arrangement whereby the typewheel shafts on all the tickers in a system are stopped at a common point to enable the same to be started in unison or to restore unison to the tickers should one or more get out of step. In the standard self-wind tickers the escapement yoke continues to oscillate when the typewheel shaft is stopped by the unison device. This continued oscillation of the escapement yoke 32, Figs. 4 and 5, in the preferred embodiment of the invention operates the pawls 77 to wind up the spring 86, and as the typewheel shaft at this time is stopped, the tension in the spring is increased. A few oscillations of the escapement yoke following the stopping of the typewheel shaft 37 by the unison device, rotates the ratchet 78 and sleeve 87 to bring the arm 92 rotating therewith into engagement with the left hand side of the notch 93 on the collar 94. As the collar 94 is fixed to the shaft 37, the amount of rotation of the sleeve 87 relative to the shaft is determined by the length of the notch 93 in the collar 94, and with the typewheel shaft stopped in a unison position by the unison device, engagement of the arm 92 with the left hand edge of the notch 93 prevents further rotation of the collar 94. With the sleeve 87 thus held from rotating, the pawls 77 cooperating with the teeth of the ratchet 78 prevents further oscillations of the escapement yoke 32, and the adjustment of the collar 94 on the typewheel shaft 37 is such that when further rotation of the sleeve 87 is thus stopped, as above set forth, the escapement yoke 32 is invariably held to one side and will always be held at this same side when the typewheel shaft is stopped in its unison position. Thus, with the escapement yoke invariably stopped on the same side when the ticker runs to unison, the first press impulse following the running of the ticker to unison ensures that the typewheels on the system are all in step.

In the standard self-winding ticker a shift magnet is employed to control the printing from either one or the other of the two rows of type on the typewheel, and as shown in Fig. 1 of the preferred embodiment of the invention no shift magnet is employed, the shift being effected through a mechanical arrangement hereinafter described. As shown in Fig. 11, the typewheel 97 on the typewheel shaft 37 is located above a set of two printing or print levers 98. The recording paper 99 passes between the typewheels and the print levers and printing occurs when a print lever is operated to press the recording paper against the selected character on the typewheel. The print levers are pivotally mounted at 101 adjacent the left hand ends thereof, while depending from adjacent the free right hand ends thereof are separate spaced projections 102 and 103. The projection 103 is further from the pivot point than the projection 102 in order that a print bar 104 may cooperate with either one or the other of the projections 102 and 103 at a time. The print bar 104 is carried in the lower end of a link 106 which in turn is pivotally attached at its upper end to a press lever 107. The press lever 107 is pivoted at its left hand end on a rod such as 108 and is operated to elevate the press bar 104 whenever the press magnet such as 21, Fig. 1, is energized. The position of the print bar 104 underneath the projections 102 and 103 to effect operation of either one or the other of the print levers 98 on the energization of the press magnet is controlled by two deflectors 109 and 111. The deflectors 109 are pivoted at their left-hand ends, as shown in Figs. 10 and 12, on a rod 112 and in their normal position rest on a stop 113. The deflector 109 has a surface 114 adjacent the free end thereof sloping upwardly toward the left, and the deflector 111 has adjacent the free end thereof a surface 116 sloping upwardly toward the right. Extending upwardly from the deflectors 109 and 111 at the free ends thereof are spaced fingers 117 and 118, respectively, adapted to cooperate with pins such as 119 carried in a collar 121 fixed to the typewheel shaft 37 for rotation therewith. The fingers 117 and 118 are so spaced that the pins 119 cooperate with only one of the fingers at a time.

Assume that the print bar 104 is in operative relation with the projection 103 on the print lever 98, as shown in Fig. 11, and that it is desired to shift the same into operative relation with the projection 102 on the other print lever. Accordingly, the typewheel shaft 37 is stepped to bring one of the pins 119 directly over the finger 117 on the deflector 109, following which a press impulse is transmitted. The elevation of the print bar 104 in response to the press impulse brings the bar into engagement with the sloping surface 114 and after a slight elevation of the deflector 109 by the engagement of the print bar with the surface 114, the finger 117 engages the pin 119 to block further movement of the deflector whereupon the print bar is cammed toward the left. The movement of the print bar 104 to the left places the same beneath the projection 102 on the first print lever 98, and hence following operations of the print bar by the press magnet operate the first print lever to record from the first row of type elements. The front end of the shift bar 104 is engaged in the upper end of a shift fork 122 pivotally mounted at its lower end on a pin 123. In the standard self-winding ticker the shift fork 122 has associated therewith a permanent magnet 124 to cooperate in shifting the fork from one position to the other when the polarity of the current in the winding of the shift magnet, not shown, is changed. In the preferred embodiment of the invention the permanent magnet 124 is employed but not the magnet on the shift fork, the permanent magnet in the preferred embodiment merely cooperating with the shift fork 122 to bias or jockey the same into one or the other of its two operated positions. Obviously, a mechanical arrangement could be provided for jockeying the shift fork, the permanent magnet 124 being employed merely as a matter of convenience.

With the print bar underneath the projection 102 on the print lever, the stopping of the typewheel shaft in such a position as to place one of the pins 119 over the finger 118 on the deflector 111 blocks all substantial movement of the said deflector to cause the sloped surface 116 to cam the print bar toward the right. Thus, depending upon the position of the typewheel shaft to place a pin 119 over either one or the other of the fingers 117 and 118 either one or the other of the print levers 98 are operated on following press impulses. Obviously, when the deflector 109 and 111 are not blocked by the pins 119, they merely move upward and have no effect on shifting the print bar 104.

From the above it will be evident that step-by-step tickers, such as the self-winding and the universal tickers, can be operated by signals received over a single circuit, the signals being composed of two polarities and of substantially the same current values, no increments of current being required to successfully operate the tickers.

It will be obvious, of course, that various other modifications of the invention other than those shown and described herein may be made without departing from the spirit or essential attributes thereof, and it is desired, therefore, that only such limitations be placed thereon as are imposed by the prior art or are specifically set forth in the appended claims.

What is claimed is:

1. In combination, a source of impulses of opposite polarity, a rectifier, means for applying said signals to the mid-point of said rectifier with one polarity of said signals passing through said rectifier to one terminal thereof and the other polarity of said signals passing through said rectifier to the other terminal, separate sets of electromagnetic devices connected to the terminals of said rectifier to be alternately energized by said impulses, a vibratory member associated with said electromagnetic devices, a resilient means associated with said vibratory member normally tending to hold the same in a neutral position relative to said electromagnetic devices, means operative on the alternate energization of said electromagnetic devices to vibrate said vibratory member and means including said resilient means to accelerate the initial movement of said vibratory member in moving from one position to the other.

2. In a telegraph receiver, a typewheel shaft, a typewheel on said shaft with a plurality of peripheral rows of characters, a plurality of print levers, one individual to each of said peripheral rows of characters, means for selectively rotating said typewheel shaft to place selected typewheel characters over said print levers, a press bar for operating said print levers, said press bar being shiftable from one position to another to selectively operate said print levers one at a time, means for operating said press bar, a set of press bar deflectors normally operating with said press bar and means dependent on the selected rotative position of said typewheel shaft for selectively blocking movement of said deflectors one at a time to shift said press bar on operation thereof from one of said positions to the other to selectively operate said print levers.

3. In a telegraph receiver, a typewheel shaft, a typewheel on said shaft with a plurality of peripheral rows of characters, a plurality of print levers, one individual to each of said peripheral rows of characters, means for selectively rotating said typewheel shaft to place selected typewheel characters over said print levers, a press bar for operating said print levers, said press bar being shiftable from one position to another to selectively operate said print levers one at a time, means for operating said press bar, a set of press bar deflectors normally operating with said press bar, means dependent on the selected rotative position of said typewheel shaft for selectively blocking movement of said deflectors one at a time to shift said press bar on operation thereof from one of said positions to the other to selectively operate said print levers, and means for retaining said press bar in the shifted position until the same is again shifted by the blocking of another of said deflectors.

4. In a telegraph receiver, a typewheel shaft, a typewheel on said shaft with a plurality of peripheral rows of characters, a plurality of print levers, one individual to each of said peripheral rows of characters, means for selectively rotating said typewheel shaft to place selected typewheel characters over said print levers, a press bar for operating said print levers, said press bar being shiftable from one position to another to selectively operate said print levers one at a time, means for operating said press bar, a set of pivotable press bar deflectors, said deflectors normally pivoting with said press bar on each operation thereof, means carried by said typewheel shaft cooperable with said deflectors one at a time in selected positions of said shaft and means operable on the operation of said press bar with a deflector in cooperable relation with said last mentioned means for shifting said press bar from one shift position to another.

5. In a step-by-step telegraph recorder, a rotatable escapement shaft, resilient means normally tending to rotate said shaft, an oscillating means for escaping said shaft a predetermined amount on each oscillation thereof, means for tensioning said resilient means on each oscillation of said oscillating means an amount equal to the decrease in tension thereof on each escapement of said shaft, means for rendering said oscillating means ineffective to escape said shaft regardless of further oscillations thereof and means operative after not more than a predetermined number of oscillations of said oscillating means following the operation of said last mentioned means for stopping further oscillations of said oscillating means.

6. In a step-by-step telegraph recorder, a rotatable escapement shaft, resilient means normally tending to rotate said shaft, an oscillating means for escaping said shaft a predetermined amount on each oscillation thereof, means for tensioning said resilient means on each oscillation of said oscillating means an amount equal to the decrease in tension thereof on each escapement of said shaft, means for rendering said oscillating means ineffective to escape said shaft regardless of further oscillations thereof, means operative after not more than a predetermined number of oscillations of said oscillating means following the operation of said last mentioned means for stopping further oscillations of said oscillating means, and means operative on the stopping of said oscillating means by said last mentioned means to invariably stop the same in a predetermined position.

PERCY L. MYER.
CHARLES C. GALL.
MAX U. DAVIS.